US 8,805,955 B2

(12) United States Patent
Suchý

(10) Patent No.: US 8,805,955 B2
(45) Date of Patent: Aug. 12, 2014

(54) PROACTIVE CACHING OF REMOTE ACTIONS

(75) Inventor: Miroslav Suchý, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 293 days.

(21) Appl. No.: 13/185,117

(22) Filed: Jul. 18, 2011

(65) Prior Publication Data
US 2013/0024540 A1    Jan. 24, 2013

(51) Int. Cl.
*G06F 15/16* (2006.01)
*G06F 15/173* (2006.01)
*G06F 9/44* (2006.01)
*G06F 9/445* (2006.01)

(52) U.S. Cl.
USPC ......... 709/217; 709/223; 717/171; 717/172; 717/173; 717/176; 717/177; 717/178

(58) Field of Classification Search
USPC ...................................................... 709/217
See application file for complete search history.

(56) References Cited

U.S. PATENT DOCUMENTS

| | | | | |
|---|---|---|---|---|
| 5,555,416 A * | 9/1996 | Owens et al. | ................... | 717/178 |
| 6,006,035 A * | 12/1999 | Nabahi | ................... | 717/175 |
| 6,161,218 A * | 12/2000 | Taylor | ................... | 717/174 |
| 6,286,041 B1 * | 9/2001 | Collins et al. | ................... | 709/221 |
| 6,427,227 B1 * | 7/2002 | Chamberlain | ................... | 717/124 |
| 6,757,708 B1 | 6/2004 | Craig et al. | | |
| 7,620,948 B1 * | 11/2009 | Rowe et al. | ................... | 717/171 |
| 8,074,213 B1 * | 12/2011 | Holtz | ................... | 717/172 |
| 8,296,756 B1 * | 10/2012 | Feeser et al. | ................... | 717/173 |
| 2002/0100036 A1 * | 7/2002 | Moshir et al. | ................... | 717/173 |
| 2003/0046371 A1 * | 3/2003 | Falkner | ................... | 709/220 |
| 2003/0051236 A1 * | 3/2003 | Pace et al. | ................... | 717/177 |
| 2003/0154265 A1 * | 8/2003 | Raffaele et al. | ................... | 709/221 |
| 2005/0055686 A1 * | 3/2005 | Buban et al. | ................... | 717/170 |
| 2006/0080651 A1 * | 4/2006 | Gupta et al. | ................... | 717/169 |
| 2006/0117018 A1 | 6/2006 | Christiansen et al. | | |
| 2006/0277542 A1 * | 12/2006 | Wipfel | ................... | 717/174 |
| 2007/0038897 A1 * | 2/2007 | Lainer | ................... | 714/38 |
| 2007/0169109 A1 * | 7/2007 | Neswal | ................... | 717/174 |
| 2008/0028392 A1 * | 1/2008 | Chen et al. | ................... | 717/175 |
| 2008/0126444 A1 * | 5/2008 | van Ingen et al. | ................... | 707/204 |
| 2008/0320109 A1 * | 12/2008 | Andrews et al. | ................... | 709/220 |
| 2009/0144719 A1 * | 6/2009 | Pazdziora | ................... | 717/171 |
| 2009/0241100 A1 * | 9/2009 | Sakurai et al. | ................... | 717/170 |
| 2009/0252325 A1 * | 10/2009 | Reus et al. | ................... | 380/255 |
| 2009/0265586 A1 * | 10/2009 | Fitoussi et al. | ................... | 714/48 |
| 2009/0271781 A1 * | 10/2009 | Cui et al. | ................... | 717/173 |
| 2009/0319731 A1 * | 12/2009 | Kirihata | ................... | 711/155 |

(Continued)

OTHER PUBLICATIONS

HP Software Distributor Administration Guide HP-UX 11i v1, 11i v2, and 11i v3, HP Part No. 5992-5875, Hewlett-Packard, Mar. 2009.*

(Continued)

*Primary Examiner* — David Lazaro
*Assistant Examiner* — Robert Shaw
(74) *Attorney, Agent, or Firm* — Lowenstein Sandler LLP (57) ABSTRACT

A method and system for managing maintenance events in an enterprise computing environment. A client receives a maintenance file associated with a maintenance event from a server. The client device stores the maintenance file in local storage (e.g., cache), without installing the maintenance file. Subsequently, the client device receives an instruction from the server to install the previously downloaded and stored maintenance file.

19 Claims, 5 Drawing Sheets

(56) References Cited

U.S. PATENT DOCUMENTS

| | | | |
|---|---|---|---|
| 2010/0005450 A1* | 1/2010 | Joy et al. | 717/121 |
| 2010/0030871 A1 | 2/2010 | Jolly et al. | |
| 2010/0042990 A1* | 2/2010 | Kinder | 717/177 |
| 2010/0049786 A1* | 2/2010 | Tada | 709/203 |
| 2010/0153527 A1* | 6/2010 | Venouss | 709/223 |
| 2010/0251232 A1* | 9/2010 | Shinomiya | 717/177 |
| 2011/0029966 A1* | 2/2011 | Moshir et al. | 717/173 |
| 2011/0179410 A1* | 7/2011 | Cui et al. | 717/178 |
| 2011/0296394 A1* | 12/2011 | Vidal et al. | 717/171 |
| 2011/0296397 A1* | 12/2011 | Vidal et al. | 717/171 |
| 2012/0144378 A1* | 6/2012 | Shah | 717/170 |

OTHER PUBLICATIONS

D. Miller, SD-UX Depot Management Tools and Tricks, HP World Conference & Expo (2002).*

* cited by examiner

PROACTIVE CACHING OF REMOTE ACTIONS

TECHNICAL FIELD

Embodiments of the present invention relate to enterprise computing systems, and more specifically, to managing maintenance events in an enterprise computing environment.

BACKGROUND

Many enterprise computing systems require a central management system to control and manage the maintenance of a large number of distributed client devices. The central management system establishes maintenance schedules dictating the date and time that a maintenance event will take place. A maintenance event takes place during a set period of time, referred to as the maintenance window, and requires the central management system to download a maintenance related file to the client device and instruct the client device to install and execute the maintenance file.

The download and installation processes tax the resources of the client device. For that reason, the maintenance window may be scheduled during an off-peak time for the client device so that the client device is not occupied or utilized during primary production times. A large portion of the maintenance window may be taken up by the downloading phase of the maintenance event, particularly in instances when the maintenance file is large. In some cases, the download phase may take over half the time of the maintenance window, leaving a shortened period of remaining time for installation and execution of the maintenance file before the close of the maintenance window. As the sophistication and size of enterprise computing systems continues to increase, efficient management of maintenance schedules and optimization of maintenance window usage to facilitate a more expeditious return to production continues to be a priority.

DETAILED DESCRIPTION

Methods and systems for managing maintenance events in an enterprise computing system including a number of client devices. An enterprise server maintains a maintenance schedule having a number of maintenance events that are to be executed on the communicatively connected client devices. During an initial "download" phase, a client device communicates with the enterprise server to determine whether there is a scheduled maintenance event affecting the client device. Upon identification of a scheduled event, the client device receives from the enterprise server a file relating to the maintenance event (i.e., a file configured to perform the maintenance event). In the download phase, the client device downloads and stores the file in a local storage (e.g., the cache of the client device), but does not install the file. The client device proactively stores or caches the file for later action.

During a subsequent "installation" phase, the client device communicates with the enterprise server to determine whether a scheduled maintenance event is due for execution (i.e., determine whether a related maintenance window is open or scheduled to open soon). If a maintenance event is due, the client device determines whether it already has the necessary maintenance file stored in local storage, and if so, installs and executes the file in response to an instruction from the enterprise server.

In one embodiment, the maintenance file includes any computer-readable set of instructions relating to the execution of a maintenance event. The maintenance file, may include, but is not limited to, a software package (e.g., a glibc package, a kernel package, a LibreOffice package), an errata file, a configuration file (e.g., a Flash ADC file, a database path file, or the like), or a remote script (e.g., a back-up file script, a monitoring script, or the like).

For example, the maintenance file may be a glibc software package, also known as the GNU C Library, representing a C standard library configured to provide, inter alia, functionality required by the Single Unix Specification, Portable Operating System Interface for Unix (POSIX) and certain functionality required by ISO C99, Berkeley Unix (BSD) interfaces, the System V Interface Definition (SVID) and the X/Open Portability Guide (XPG). In another example, the maintenance file may be a kernel package configured to, for example, provide, update, or modify a kernel.

In yet another example, the maintenance file may be the LibreOffice package which includes an office suite of programs including, for example, the LibreOffice Writer program (a word processing application), the LibreOffice Calc program (a spreadsheet application), and the LibreOffice Impress program (a presentation application).

In one embodiment, the client device includes a client maintenance event manager module configured to periodically communicates with the enterprise server via a network to determine whether there are any maintenance files to be downloaded (but not installed) relating to scheduled maintenance events and whether there are any installation instructions relating to a previously downloaded maintenance file.

In one embodiment, the client device stores an identifier associated with a maintenance file that it has downloaded (i.e., a downloaded file identifier). Later, the client device receives an instruction to install/execute a maintenance file associated with a current maintenance event (i.e., a maintenance event that is due for execution). The installation instruction includes an identifier (i.e., a maintenance file identifier). The client device compares the maintenance file identifier against the one or more downloaded file identifiers stored locally to determine whether the client device has already downloaded the maintenance file relating to the current maintenance event. If a match is found, the client device installs and executes the appropriate downloaded maintenance file. If a match is not found (i.e., the client device does not have the appropriate maintenance file in local storage), the client device downloads and installs the maintenance file associated with the current maintenance event.

In one embodiment, the enterprise server is communicatively connected to a maintenance file repository configured to store the one or more maintenance files to be managed and distributed by the enterprise server. The maintenance file repository may include, for example, a database, data stores accessible via Internet, and/or local or remote data stores specified by a system administrator. In an embodiment, the maintenance file repository may be controlled by an enterprise server administrator and may be provided with maintenance files by an internal or external source relative to the enterprise server, such as, for example, a communicatively connected database, the Red Hat® Network or the Red Hat® Network Satellite.

Accordingly, an efficient mechanism is provided that optimizes the maintenance window for a maintenance event by first downloading the maintenance file to the one or more client devices. The downloaded file is not installed at this stage of the process, but instead is stored in a local storage of the client device. Upon receipt of a later instruction from the enterprise server at the time of an associated maintenance window, the client device confirms that it has the appropriate maintenance file stored locally, and installs and executes the file.

Figure 1:
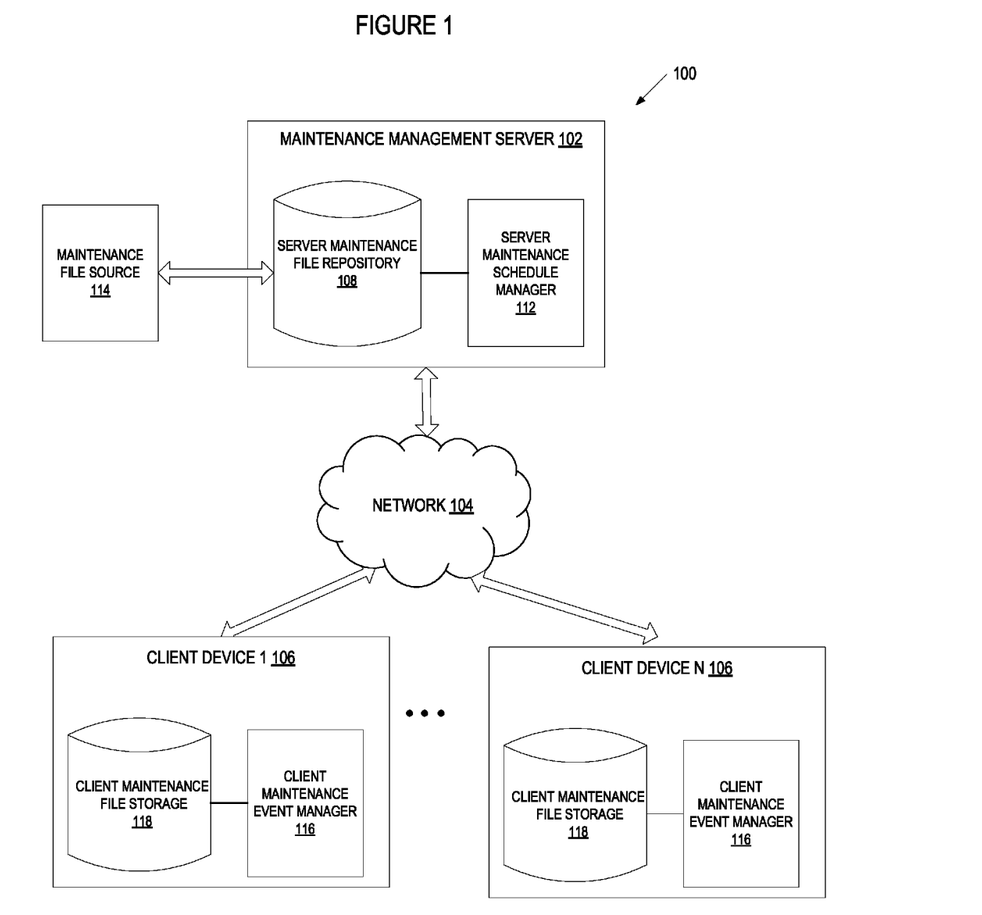
FIG. 1 is a block diagram of an exemplary network architecture in which embodiments of the invention may operate.

FIG. 1 is a block diagram of exemplary network architecture 100 in which embodiments of the invention may operate. The network architecture 100 may include a maintenance management server 102 (also referred to as "enterprise server" or "server") and multiple client devices 106 coupled to the maintenance management server 102 via a network 104 (e.g., a public network such as the Internet, a private network such as a local area network (LAN), or a virtual private network (VPN)). The client devices 106 may include any type of computing device such as, for example, a desktop computer, a portable digital assistant, a mobile phone, a laptop computer, a portable media player, a tablet computer, a netbook, a notebook, or a personal computer.

The maintenance management server 102 maintains and manages a maintenance program for the multiple client devices 106. In an embodiment, the maintenance management server 102 includes a server maintenance schedule manager 112 configured to store and manage a maintenance schedule having a number of maintenance events that are to be executed on one or more of the communicatively connected client devices 106. The server maintenance schedule manager 112 is controlled by a system administrator responsible for managing the maintenance management server 102 and setting the maintenance schedule.

As shown in FIG. 1, the server 102 further includes a server maintenance file repository 108 configured to receive and store multiple maintenance files to be distributed to the client devices 106 pursuant to the maintenance schedule. The maintenance file includes any computer-readable set of instructions configured to perform or execute a maintenance event. The maintenance file, may include, but is not limited to, a package, a configuration file (e.g., a Flash ADC file, a database path file, or the like), or a remote script (e.g., a back-up file script, a monitoring script, or the like). Although illustrated as being a local component of server 102, one having ordinary skill in the art will appreciate that the server maintenance file repository 108 may be remote from the server 102 and may be connected to the server 102 via any suitable communicative connection.

The server maintenance file repository 108 receives maintenance files from a communicatively connected maintenance file source 114. The maintenance file source 114 may be any provider of maintenance files, including for example, any internal or external processing and/or storage device relative to the enterprise server, such as, for example, a communicatively connected database, the Red Hat® Network or the Red Hat® Network Satellite.

One having ordinary skill in the art will appreciate that although the maintenance file source 114 is shown schematically as separate from the server 102, the maintenance file source 114 may be logically configured within the server 102 and controlled, for example, by the system administrator.

The client device includes a client maintenance event manager 116 configured to communicate with the server maintenance schedule manager 112 of the server 102 during an initial "download" phase and a subsequent "installation" phase. During the download phase, the client maintenance event manager 116 communicates with the maintenance schedule manager 112 to determine if there is any available information relating to a scheduled maintenance event. The information provided by the server maintenance schedule manager 112 may include an indication of a current maintenance event (i.e., one that is due for execution) and/or an indication of a future maintenance event.

If the server maintenance schedule manager 112 identifies a planned maintenance event for which the associated maintenance window has not yet opened, it will retrieve the maintenance file associated with the scheduled maintenance event, and provide or download the file to the client device 106 for storage in the client maintenance file storage 118. During the installation phase, the client maintenance event manager 116 again communicates with the server maintenance schedule manager 112 to determine if there any maintenance events due (i.e., events having a maintenance window that is currently open or that is scheduled to open in the near future). If a maintenance event is due, the server maintenance schedule manager 112 instructs the client maintenance event manager 116 to install the appropriate maintenance file. In response to the instruction, the client maintenance event manager 116 retrieves the identified maintenance file from the client maintenance file storage 118 and installs and executes the file, thereby executing the maintenance event.

In an embodiment, the client maintenance file storage 118 includes a table having an identifier associated with each maintenance file downloaded by the client device 106 during the download phase (referred to as the "downloaded file identifier"). During the installation phase, the client maintenance event manager 116 receives an identifier of the maintenance event that is due (referred to as the "maintenance file identifier"), and checks the table to determine whether there is a match between any stored downloaded file identifiers and the maintenance file identifier. If a match is found, the client maintenance event manager 116 initiates installation of the previously downloaded maintenance file. One having ordinary skill in the art will appreciate that any technique for identifying the maintenance file and producing an associated downloaded file identifier and/or maintenance file identifier may be employed.

According to an embodiment, the downloaded file identifier and the maintenance event identifier are the checksum values of the corresponding maintenance file. In this embodiment, the client maintenance event manager 116 compares the checksum of the downloaded maintenance file with a checksum associated with the maintenance file that is ready for installation as provided by the server maintenance schedule manager. If the two checksum values match, the client maintenance event manager 116 determines that the previously downloaded maintenance file is ready for installation.

Figure 2:
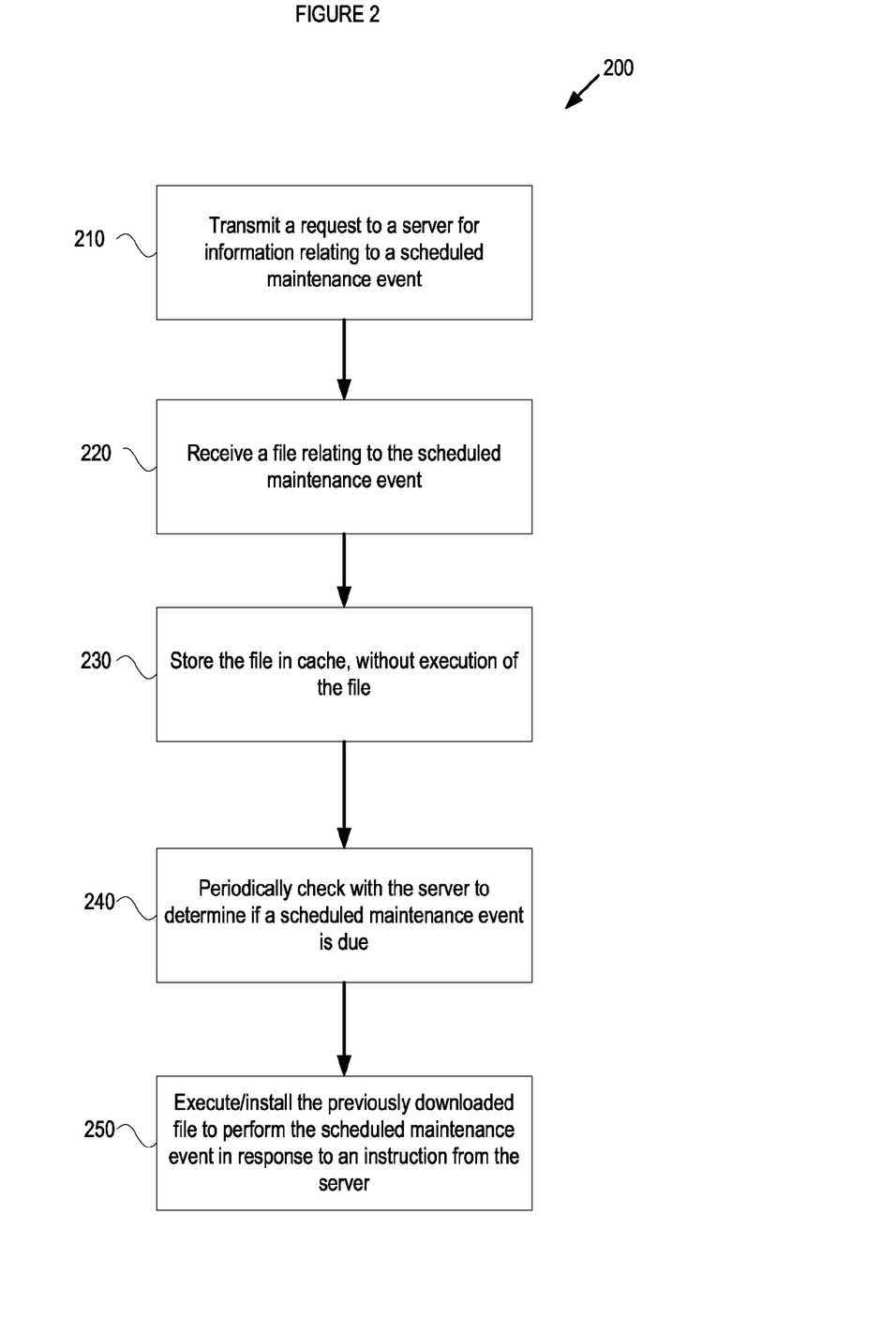
FIG. 2 is a flow diagram of one embodiment of a client-side method for managing a maintenance event.

FIG. 2 is a flow diagram of one embodiment of a client-side method 200 for downloading and installing a maintenance file. The method is performed by processing logic that may comprise hardware (circuitry, dedicated logic, etc.), software (such as is run on a general purpose computer system or a dedicated machine), or a combination of both. In one embodiment, the method is performed by a client device (e.g., client device 106 of FIG. 1).

Referring to FIG. 2, method 200 begins with the client device transmitting a request to a maintenance management server (e.g., server 102 of FIG. 1) for information relating to a scheduled maintenance event (block 210). In block 210, the client device queries the server to determine whether there are any scheduled maintenance events for the client device. The information provided by the server may include an indication of a current maintenance event (i.e., one that is due for execution) and/or an indication of a future (or scheduled) maintenance event. If there is a scheduled maintenance event for the client device, a file relating to the scheduled maintenance event is downloaded by the client device (block 220). The client device is instructed to download the maintenance file, but does not receive an instruction to install the file. At block 230, without installing or executing the file, the client device stores the downloaded file in local storage (e.g., client maintenance file storage 118 in FIG. 1). In an embodiment, the downloaded maintenance file is stored in the cache of the client device.

At block 240, during the installation phase, the client device periodically checks with the maintenance management server to determine if there is a scheduled maintenance event that is due for the client device. One having ordinary skill in the art will appreciate that the frequency with which the client device checks with the server may be set to any suitable value. In some cases, the time interval between the downloading of a file and the installing of the file is a minimum number of hours, such as, for example, four hours to twenty four hours.

At block 250, upon receipt of an instruction from the server that a maintenance event is due, the client device identifies the appropriate downloaded maintenance file from its storage and installs and executes the file. In operation, there is a time interval between the caching of the maintenance file (e.g., block 230) occurring during the download phase and the maintenance event and installation of the maintenance file (e.g., blocks 240 and 250) occurring during the installation phase. In some cases, the time interval between the download phase and the installation phase may be significant (e.g., a time interval of a minimum number of hours, such as, four hours to twenty four hours).

Figure 3:
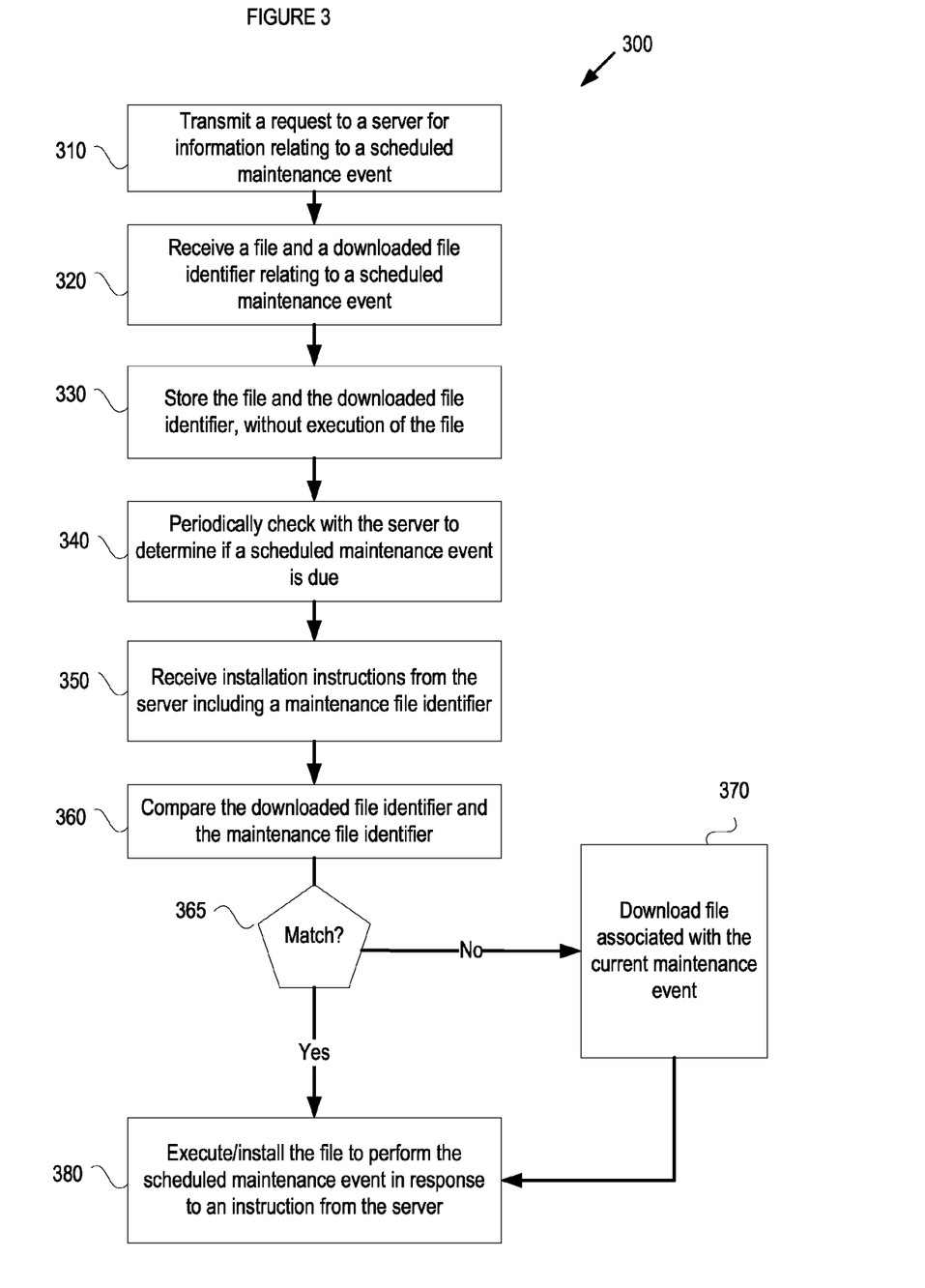
FIG. 3 is a flow diagram of one embodiment of a client-side method for managing a maintenance event including a file identifier comparison.

FIG. 3 is a flow diagram of one embodiment of a client-side method 300 for downloading and installing a maintenance file. The method is performed by processing logic that may comprise hardware (circuitry, dedicated logic, etc.), software (such as is run on a general purpose computer system or a dedicated machine), or a combination of both. In one embodiment, the method is performed by a client device (e.g., client device 106 of FIG. 1).

Referring to FIG. 3, method 300 begins with the client device transmitting a request to a maintenance management server (e.g., server 102 of FIG. 1) for information relating to a scheduled maintenance event (block 310). In block 310, the client device queries the server to determine whether there are any scheduled maintenance events for the client device. If there is a scheduled maintenance event for the client device, a file relating to the scheduled maintenance event and a downloaded file identifier is received by the client device (block 320). In block 320, the client device is instructed to download the maintenance file and the downloaded file identifier, but does not receive an instruction to install the file. At block 330, without installing or executing the file, the client device stores the downloaded file and the downloaded file identifier in local storage (e.g., client maintenance file storage 118 in FIG. 1). In an embodiment, the downloaded maintenance file and downloaded file identifier is stored in the cache of the client device. The downloaded file identifier may be a checksum value associated with the downloaded file, and may be stored in a table in the cache of the client device.

At block 340, during the installation phase, the client device periodically checks with the maintenance management server to determine if there is a scheduled maintenance event that is due for the client device. One having ordinary skill in the art will appreciate that the frequency with which the client device checks with the server may be set to any suitable value, and the time interval between the downloading of a file and the installing of the file may be a minimum number of hours, such as, for example, four hours to twenty four hours.

At block 350, the client device receives instructions from the server that a maintenance event is due. The instructions include a maintenance file identifier (i.e., information identifying the particular maintenance file that is associated with the maintenance event that is due). At block 360, the client device compares the maintenance file identifier against the one or more downloaded file identifiers stored in the client device's local storage (e.g., cache). If, in block 365, a match is found, the client device installs the appropriate maintenance file stored in local storage, in block 380. If no match is found, the client device downloads and installs a maintenance file associated with the maintenance file identifier, in block 370, then installs the file, in block 380.

Figure 4:
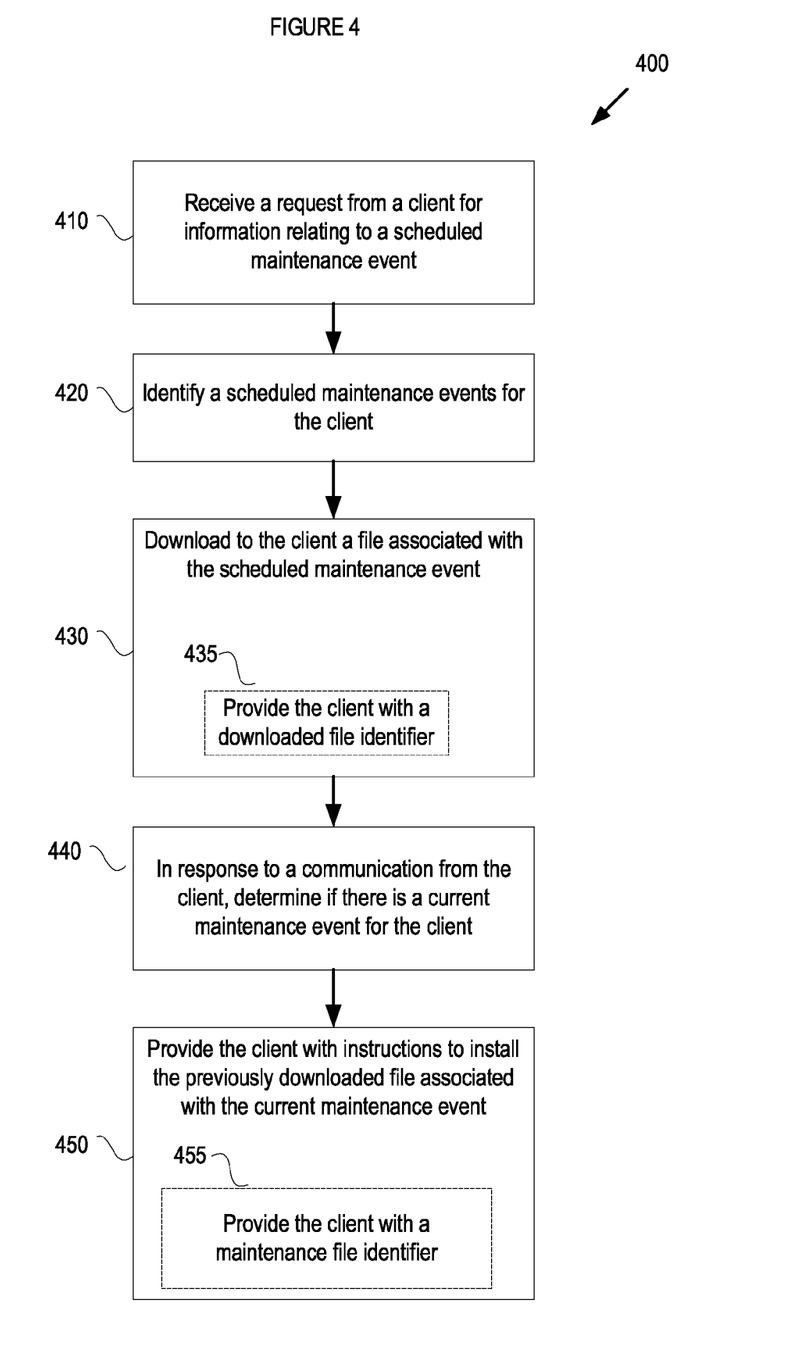
FIG. 4 is a flow diagram of one embodiment of a server-side method for managing a maintenance event.

FIG. 4 is a flow diagram of one embodiment of a server-side method 400 for managing a maintenance program in an enterprise computing environment. The method is performed by processing logic that may comprise hardware (circuitry, dedicated logic, etc.), software (such as is run on a general purpose computer system or a dedicated machine), or a combination of both. In one embodiment, the method is performed by a server (e.g., maintenance management server 102 of FIG. 1).

As shown in FIG. 4, method 400 begins with the server receives a request from a client device (e.g., client device 106 in FIG. 1) for information relating to a scheduled maintenance event (block 410). Upon receipt of the query, the server checks a maintenance schedule to identify which, if any, maintenance events are scheduled for the client device (block 420). If a scheduled maintenance event is identified, the server retrieves the appropriate maintenance file from a repository (e.g., server maintenance file repository 108 in FIG. 1) and downloads the maintenance file to the client device (block 430). In this regard, the server provides the maintenance file to the client device, but does not provide an instruction to install the file. Optionally (as denoted by the dashed lines for block 435 in FIG. 4), the server also provides the client device with a downloaded file identifier (i.e., information that identifies the maintenance file downloaded to the client device). In an embodiment, if a maintenance event is not due, the server provides an explicit instruction to not install the downloaded file. For example, the server may communicate this instruction by providing the downloaded file(s) with the flag cache set to a value of "1".

In block 440, the server responds to a query from the client device and determines whether there is a current maintenance event for the client device (i.e., a maintenance event that is due and is either in the maintenance window or has a maintenance window that is scheduled to open in the near future). If there is a maintenance event due for the client device, the server provides the client device with instructions to install the previously downloaded file associated with the current maintenance event (block 450). Optionally, in block 455, the server may provide the client device with a maintenance file identifier associated with the current maintenance event. The client device uses the maintenance file identifier to determine if it already has the appropriate maintenance file stored locally as a result of a previous download. Optionally, the client device may inform the server if the downloaded filed identifier and the maintenance file identifier match, and in response, the server provides the client with the installation instructions.

Figure 5:
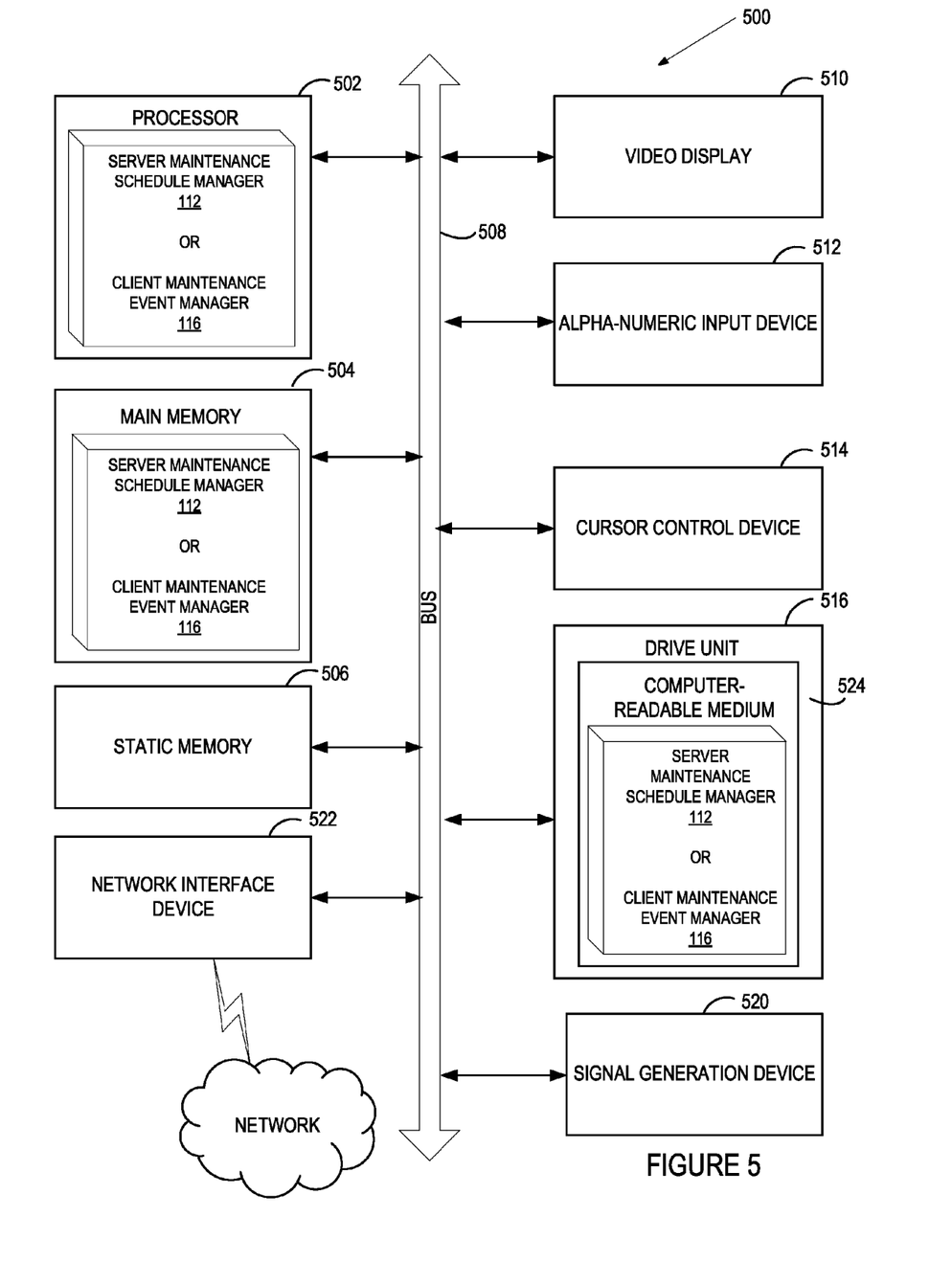
FIG. 5 illustrates an exemplary maintenance management system.

FIG. 5 illustrates an exemplary maintenance management system 500 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary maintenance management system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 506.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The maintenance management server 102 and client device 106 in FIG. 1 may comprise processor 502 configured to perform the operations and steps discussed herein.

The maintenance management system 500 may further include a network interface device 522. The maintenance management system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

drive unit 516 may include a computer-readable medium 524 on which is stored one or more sets of instructions (e.g., instructions of server 102 or client device 106) embodying any one or more of the methodologies or functions described herein. The instructions of the server 102 or client device 106 may also reside, completely or at least partially, within the main memory 504 and/or within the processor 502 during execution thereof by the maintenance management system 500, the main memory 504 and the processor 502 also constituting computer-readable media. The instructions of the server 102 or client device 106 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "transmitting", "receiving", "storing", "installing", "identifying", "downloading", "determining", "providing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   transmitting, by a processing device, a request to a server for information relating to a scheduled maintenance event;
   receiving, from the server, a file relating to the scheduled maintenance event;
   storing the file in a local storage, without installation of the file;
   querying the server, by the processing device, to determine a maintenance window associated with the installation of the file;
   receiving, from the server, in response to the query, an instruction to install the file if the maintenance window associated with the installation of the file is open; and
   installing, by the processing device, the file in response to the instruction from the server.

2. The method of claim 1, wherein a downloaded file identifier is received with the file relating to the scheduled maintenance event.

3. The method of claim 2, wherein installing the file in response to the instruction from the server further comprises:
   receiving, from the server, a maintenance file identifier relating to a scheduled maintenance event that is due, and
   comparing the downloaded file identifier and the maintenance file identifier, wherein the file is installed if there is a match.

4. The method of claim 1, wherein the file comprises at least one of a software package, a remote script, or a configuration file.

5. The method of claim 1, wherein there is a time interval of a minimum number of hours between receiving, the file relating to the scheduled maintenance event and installing the file in response to the instruction from the server.

6. A non-transitory computer readable storage medium including instructions that, when executed by a processing device cause the processing device to perform operations comprising:
   receiving, by the processing device, a request from a client for information relating to a scheduled maintenance event;
   identifying a scheduled maintenance event for the client;
   downloading to the client a file relating to the scheduled maintenance event;
   receiving, from the client, a query to determine a maintenance window associated with the installation of the file;
   providing, by the processing device, in response to the query, the client with an instruction to install the file relating to the scheduled maintenance event, if the maintenance window associated with the installation is open.

7. The non-transitory computer readable storage medium of claim 6, further comprising providing the client with a downloaded file identifier.

8. The non-transitory computer readable storage medium of claim 6, further comprising providing a maintenance file identifier with the instruction to install.

9. The non-transitory computer-readable storage medium of claim 6, wherein the file comprises at least one of a software package, a remote script, or a configuration file.

10. The non-transitory computer-readable storage medium of claim 6 further comprising maintaining a maintenance schedule comprising a plurality of maintenance events for a plurality of client devices.

11. The non-transitory computer-readable storage medium of claim 6 further comprising receiving the file associated with the scheduled maintenance event from a server maintenance file repository.

12. The non-transitory computer-readable storage medium of claim 11, wherein the server maintenance file repository stores a plurality of files received from a maintenance file source.

13. A computer system comprising:
    a memory comprising instructions,
    a processing device, coupled to the memory, the processing device executes the instructions from the memory to:
    receive, from a server, a file relating to a scheduled maintenance event, and store the file in a local storage, without installation of the file;
    query the server to determine a maintenance window associated with the installation of the file
    receive, from the server, in response to the query, an instruction to install the file if the maintenance window associated with the installation is open, and
    install the file in response to the instruction from the server.

14. The computer system of claim 13 wherein the processing device receives a downloaded file identifier with the file relating to the scheduled maintenance event.

15. The computer system of claim 13, wherein the processing device receives, from the server, a maintenance file identifier relating to the scheduled maintenance event, and compares the downloaded file identifier and the maintenance file identifier, wherein the file is installed if there is a match.

16. The computer system of claim 13, wherein the file comprises at least one of a software package, a remote script, or a configuration file.

17. The computer system of claim 13 wherein the server comprises: a server memory, a server processing device, coupled to the server memory; and a server maintenance schedule manager, executed from the server memory by the server processing device, to:
    receive a request from a client device for information relating to the scheduled maintenance event,
    download to the client device the file relating to the scheduled maintenance event,
    receive, from the client device, a query to determine a maintenance window associated with the installation of the file,
    provide the client device with an instruction to install the file relating to the maintenance event if the maintenance window associated with the installation of the file is open.

18. The computer system of claim 13 wherein the server comprises:
    a server memory,
    a server processing device, coupled to the server memory; and
    a server maintenance schedule manager, executed from the server memory by the server processing device, to:
    download to a client device a file associated with the scheduled maintenance event, during a download phase, and provide the client device with an instruction to install the previously downloaded file associated the scheduled maintenance event, during an installation phase.

19. The computer system of claim 18, wherein there is a time interval of a minimum number of hours between the download phase and the installation phase.

\* \* \* \* \*